(12) United States Patent
Nakamiya et al.

(10) Patent No.: US 11,430,474 B1
(45) Date of Patent: Aug. 30, 2022

(54) HARD DISK DRIVE SUSPENSION TAIL HAVING NARROWING TIP

(71) Applicant: Western Digital Technologies, Inc., San Jose, CA (US)

(72) Inventors: Teruhiro Nakamiya, Setagaya-ku (JP); Yasushi Inoue, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/239,174

(22) Filed: Apr. 23, 2021

(51) Int. Cl.
*G11B 5/48* (2006.01)

(52) U.S. Cl.
CPC ............ *G11B 5/484* (2013.01); *G11B 5/4826* (2013.01)

(58) Field of Classification Search
None
See application file for complete search history.

(56) References Cited

U.S. PATENT DOCUMENTS

| | | | | |
|---|---|---|---|---|
| 7,522,382 B1 * | 4/2009 | Pan | ...................... | G11B 5/4846 360/245.9 |
| 7,907,369 B1 | 3/2011 | Pan | | |
| 8,064,170 B1 * | 11/2011 | Pan | ...................... | G11B 5/4846 360/264.2 |
| 8,295,014 B1 * | 10/2012 | Teo | ........................ | G11B 5/486 360/245.9 |
| 8,320,084 B1 * | 11/2012 | Shum | ................... | G11B 5/4833 360/245.9 |
| 8,325,446 B1 * | 12/2012 | Liu | ....................... | G11B 5/4833 360/245.9 |
| 8,477,459 B1 * | 7/2013 | Pan | ....................... | G11B 5/4833 360/245.9 |
| 8,665,566 B1 | 3/2014 | Pan et al. | | |
| 9,165,580 B2 | 10/2015 | Chen et al. | | |
| 10,043,541 B1 | 8/2018 | Dunn et al. | | |

(Continued)

FOREIGN PATENT DOCUMENTS

| | | | | | |
|---|---|---|---|---|---|
| CN | 101266800 A | * | 9/2008 | ............. | H05K 3/363 |
| CN | 102467913 A | * | 5/2012 | ........... | G11B 5/4826 |

(Continued)

OTHER PUBLICATIONS

Japan Products: Business Directory of Japanese Companies, downloaded as early as Feb. 5, 2021 from http://japan-product.com/ad-category/hardware-mechanical-parts/spring-and-suspension/feed/.

(Continued)

*Primary Examiner* — William J Klimowicz
(74) *Attorney, Agent, or Firm* — John D. Henkhaus

(57) ABSTRACT

A hard disk drive suspension includes a suspension tail configured to electrically connect to a read-write transducer at a distal end and extending in a proximal direction toward a tapered tip at a proximal end, where the tapered tip comprises a decreasing taper that narrows in the proximal direction. Hence, structural overlap among adjacent suspension tails in misalignment scenarios and consequent marginalized electrical connections between the suspension tail and a corresponding flexible printed circuit are inhibited. The most proximal electrical pads of the suspension tail may be configured with a different aspect ratio, or in a fewer number of lines, from other adjacent electrical pads, thereby fitting within the narrowest portion of the tapered tip.

23 Claims, 8 Drawing Sheets

(56) References Cited

U.S. PATENT DOCUMENTS

| | | | |
|---|---|---|---|
| 2007/0188931 A1* | 8/2007 | Yao | G11B 5/4873 360/294.4 |
| 2007/0195463 A1* | 8/2007 | Erpelding | G11B 5/486 360/245.9 |
| 2011/0090601 A1 | 4/2011 | Feng | |
| 2016/0012838 A1* | 1/2016 | Arai | G11B 5/486 360/245.9 |
| 2016/0012839 A1* | 1/2016 | Arai | G11B 5/4826 360/245.9 |

FOREIGN PATENT DOCUMENTS

| | | | | | |
|---|---|---|---|---|---|
| JP | 2011009335 A | * | 1/2011 | | H05K 3/363 |
| JP | 2012123896 A | * | 6/2012 | | G11B 5/486 |

OTHER PUBLICATIONS

Nishiyama, N., et al., Analysis of Electrical Resonance of a Hard Disk Drives Suspension Interconnect and Invasion Into Read Signal Path, Materials Science, IEEE Transactions on Magnetics, 2014, 4 pages, DOI:10.1109/TMAG.2014.2322386Corpus ID: 40738033, IEEE.

* cited by examiner

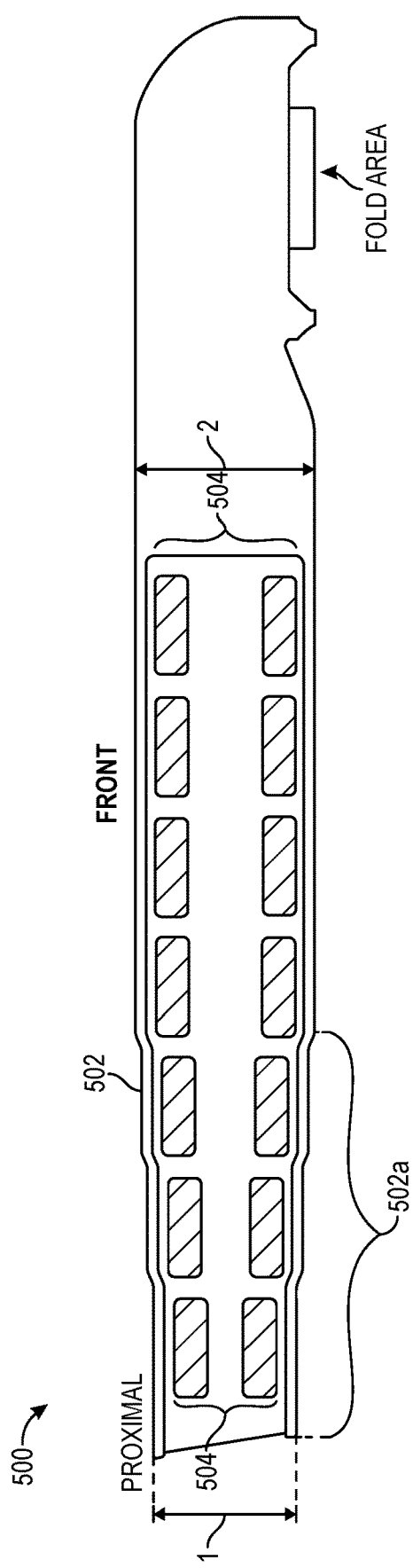
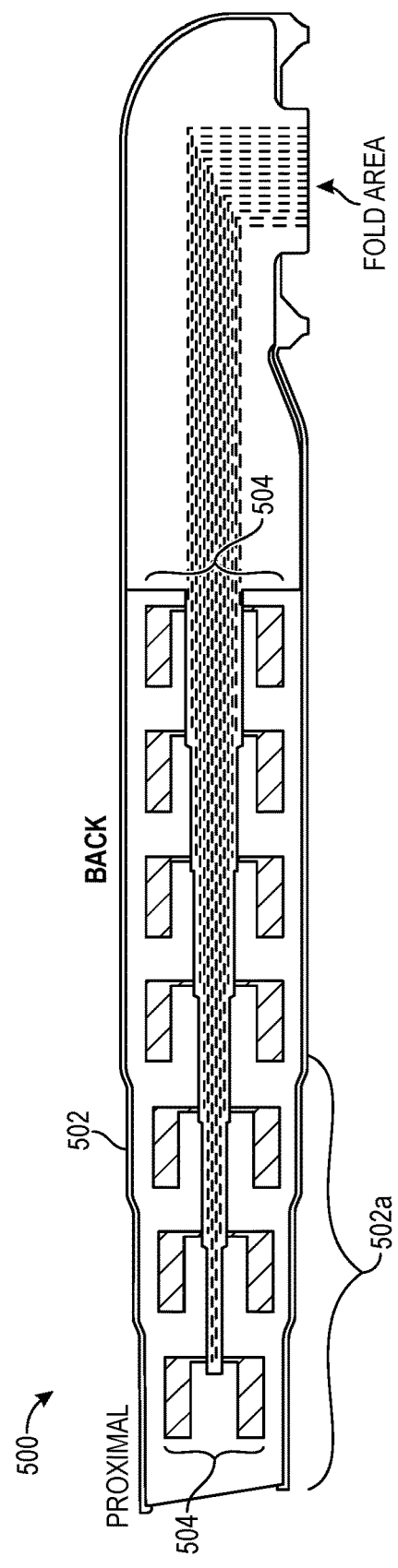
FIG. 5A
FIG. 5B

HARD DISK DRIVE SUSPENSION TAIL HAVING NARROWING TIP

FIELD OF EMBODIMENTS

Embodiments of the invention may relate generally to hard disk drives, and particularly to approaches to avoiding mechanical interference among adjacent suspension tails.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

To write data to the medium, or to read data from the medium, the head has to receive instructions from a controller. Hence, the head is connected to the controller in some electrical manner so that not only does the head receive instructions to read/write data, but the head can also send information back to the controller regarding the data read and/or the written data. Without a good electrical connection, the flow of data to/from the head may be compromised.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 5A is a front view illustrating a high-capacity suspension tail having a narrowing tip, according to an embodiment;

FIG. 5B is a back view illustrating the high-capacity suspension tail having a narrowing tip of FIG. 5A, according to an embodiment;

DETAILED DESCRIPTION

Figure 1:
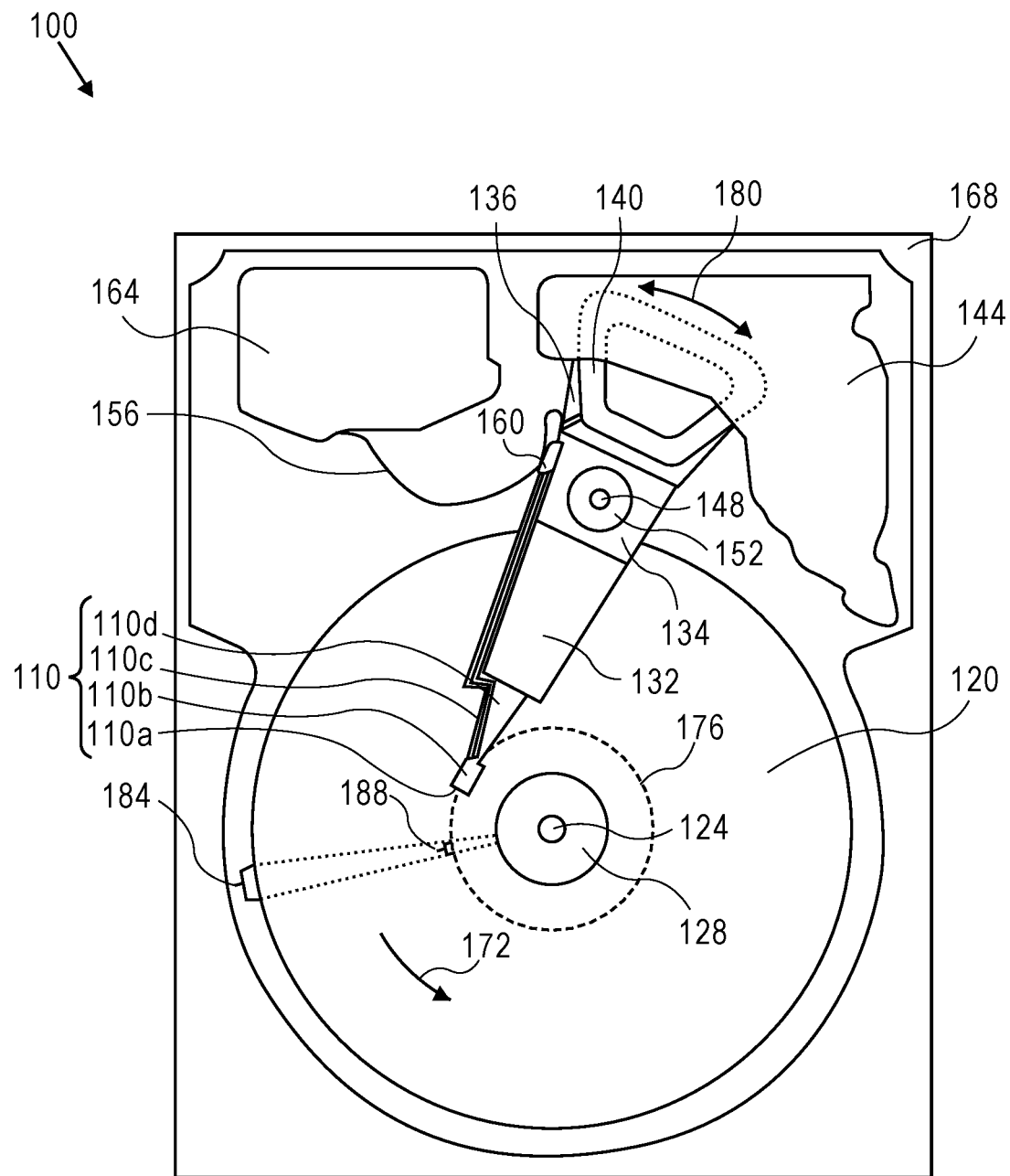
FIG. 1 is a plan view illustrating a hard disk drive, according to an embodiment.

Generally, approaches to avoiding mechanical interference among adjacent suspension tails in a hard disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

To increase the storage capacity of hard disk drives (HDDs), the number of recording media, i.e., disks, may be increased. However, the overall size and dimensions of an HDD are limited so the amount of space between adjacent disks is likely to narrow or lessen when additional disks are implemented in larger capacity HDDs. Generally, an HDD head-stack assembly (HSA) comprises a suspension-head assembly for each disk recording surface and, therefore, two suspensions need to fit between adjacent disks, e.g., one to operate upon the upper disk and one to operate upon the lower disk. Thus, with more disks employed in a fixed-size HDD, the available space between the disks for the suspensions to operate is smaller. Consequently, when the space for the suspensions becomes smaller, precise alignment of the suspensions is needed because, if one or both of the suspensions are misaligned, overlap between or interference among the suspensions can more readily occur.

At a distal end of the suspension, there is a read-write transducer (or "head") to read and write data. At the other proximal end of the suspension, there are electrically conductive pads (or simply "electrical pads") to electrically connect to corresponding electrically conductive pads on a flexible printed circuit (FPC). Surfaces of the suspension and the FPC are not parallel in their simplest form, so each suspension is folded (e.g., approximately 90 degrees) and the suspension pads and the FPC pads are electrically interconnected, typically with solder or an ACF (anisotropic conductive film) along one plane.

Figure 2A:
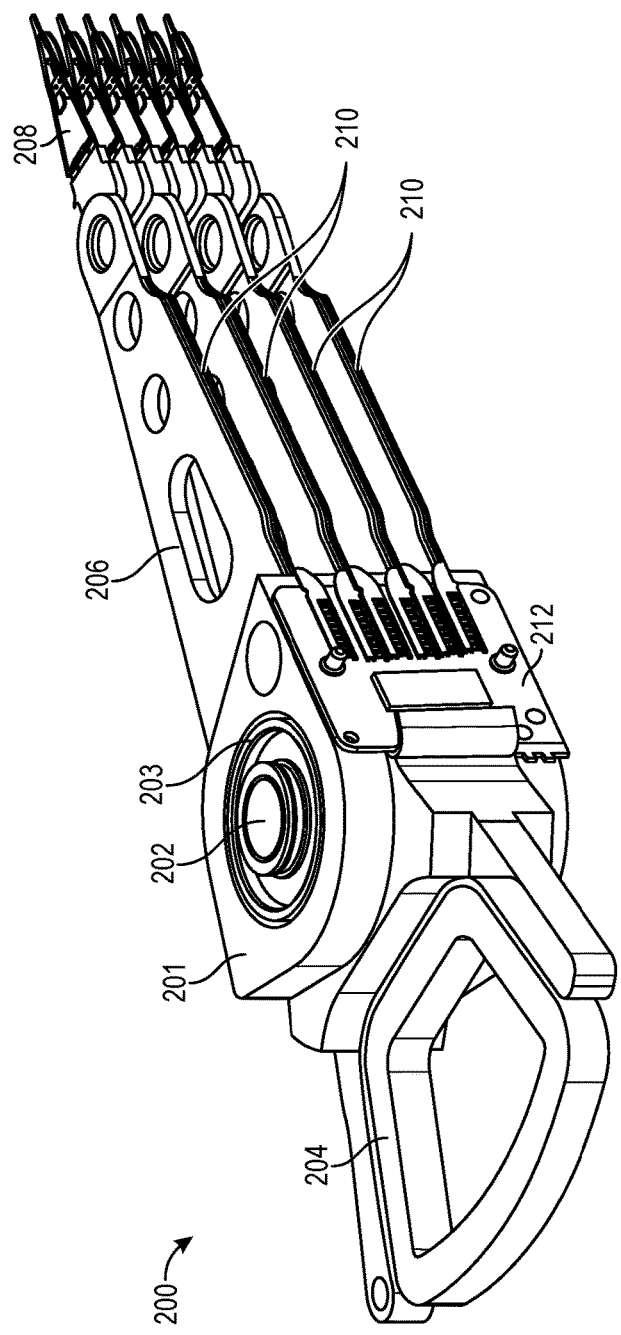
FIG. 2A is a perspective view illustrating an actuator assembly, according to an embodiment.
Figure 2B:
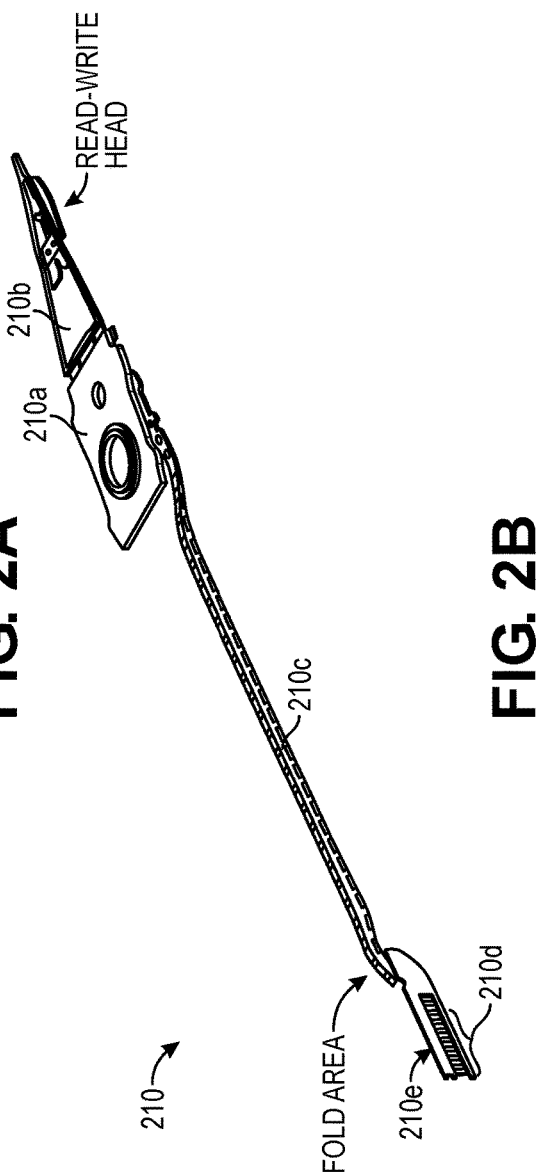
FIG. 2B is a perspective view illustrating an integrated lead suspension (ILS) of the actuator assembly of FIG. 2A, according to an embodiment.

FIG. 2A is a perspective view illustrating an actuator assembly, according to an embodiment. Actuator assembly 200 comprises a carriage 201 (see, e.g., carriage 134 of FIG. 1) rotatably coupled with a central pivot shaft 202 (see, e.g., pivot shaft 148 of FIG. 1) by way of a pivot bearing assembly 203 (see, e.g., pivot bearing assembly 152 of FIG. 1), and rotationally driven by a voice coil motor (VCM), of which a voice coil 204 is illustrated here. Actuator assembly 200 further comprises one or more actuator arm 206 (see, e.g., arm 132 of FIG. 1), to each of which is coupled a suspension assembly 208 (or simply "suspension", "lead suspension", or "integrated lead suspension" (ILS); see, e.g., lead suspension 110c of FIG. 1) which typically comprises a swaged baseplate (FIG. 2B) and a load beam (see, e.g., load beam 110d of FIG. 1; FIG. 2B). Each suspension 210 is electrically connected with a flexible printed circuit (FPC) 212 coupled with the carriage 201, by way of a suspension tail (FIG. 2B).

FIG. 2B is a perspective view illustrating an integrated lead suspension (ILS) of the actuator assembly of FIG. 2A, according to an embodiment. Suspension 210 comprises a baseplate 210a (e.g., swaged to a corresponding actuator arm 206 in the actuator assembly 200 of FIG. 2A, otherwise referred to as a head-stack assembly ("HSA")) connected to a load beam 210b, to which the read-write head is attached at a distal end. Electrical signals are carried from the head and possibly other electronic components (such as a microactuator, for a non-limiting example) at the distal end to the FPC 212 (FIG. 2A) at the proximal end, by way of electrical leads integral to a suspension tail 210c. As mentioned, the suspension tail 210c has a fold at a fold area, beyond which in the proximal direction are located multiple electrical pads 210d on a suspension tail tip 210e. These electrical pads 210d are electrically connected to the FPC 212, in the actuator assembly 200, such as with solder or an ACF.

Suspension Tail-Nominal Alignment

As discussed, any increase in the number of suspensions tends to narrow the space available for the electrical connections between the suspension 210 (FIGS. 2A, 2B) and the FPC 212 (FIG. 2A). Historically, there has been enough space for such electrical connections, as there are/were relatively large gaps between the suspensions. However, as this gap between suspensions becomes smaller, an undesirable risk of overlap between suspension tails, especially in the area of the FPC 212, becomes more significant.

Figure 3A:
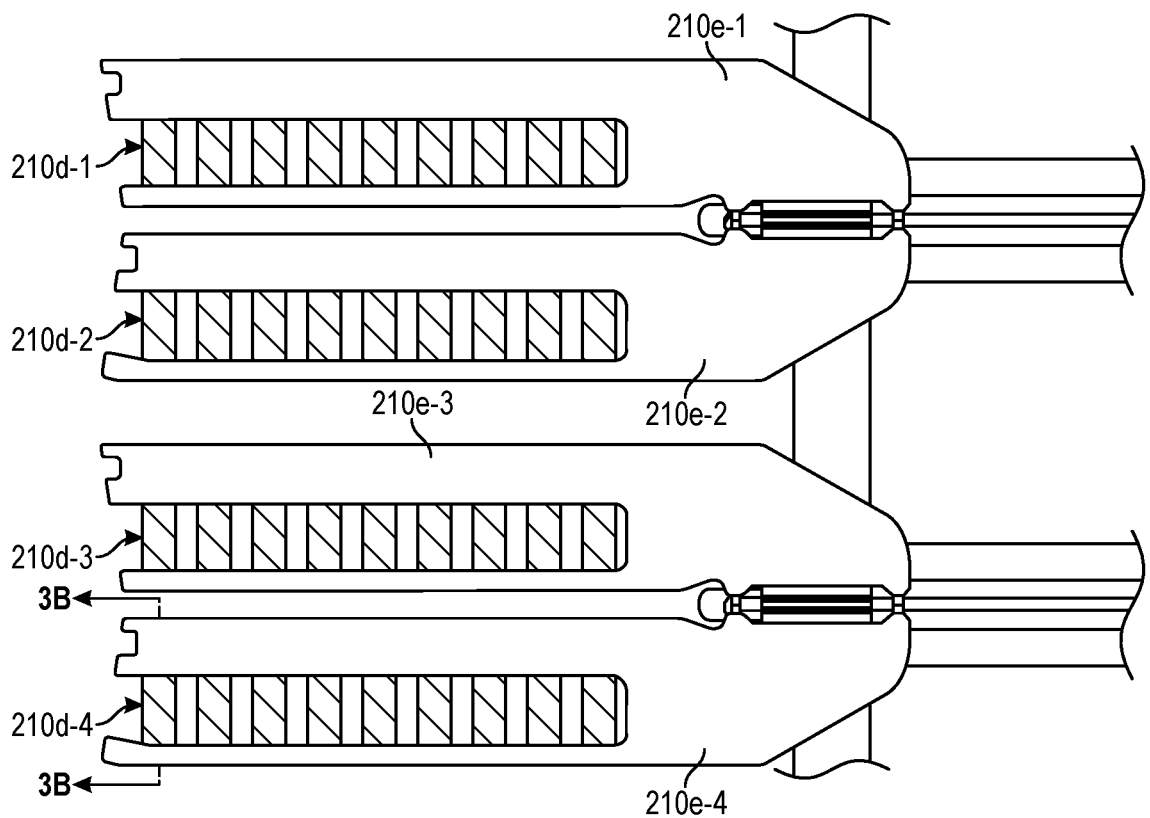
FIG. 3A is a front view illustrating adjacent suspension tail pairs in a nominal configuration, according to an embodiment.
Figure 3B:
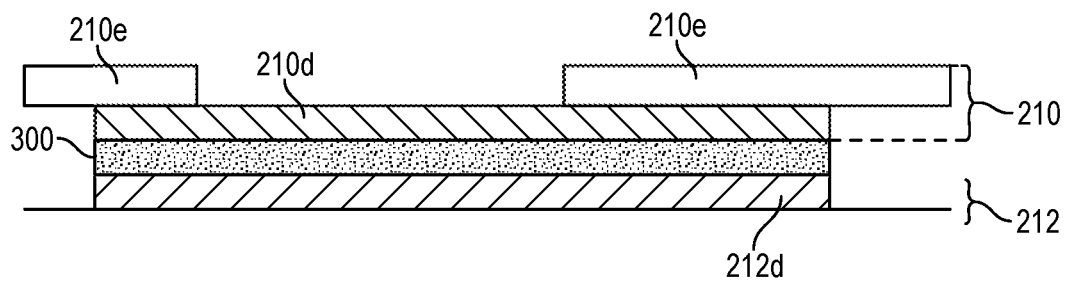
FIG. 3B is a cross-sectional view of a suspension tail of FIG. 3A assembled with a flexible printed circuit (FPC), according to an embodiment.

FIG. 3A is a front view illustrating adjacent suspension tail pairs in a nominal configuration, according to an embodiment. FIG. 3A depicts two pairs of suspension tail tips, 210e-1 & 210e-2 and 210e-3 & 210e-4, with each tail tip 210e-1 through 210e-4 having a corresponding set of electrical pads 210d-1, 210d-2, 210d-3, 210d-4. Here, because the space between suspension tails is relatively large, there is no overlap depicted. FIG. 3B is a cross-sectional view of a suspension tail of FIG. 3A assembled with a flexible printed circuit (FPC), according to an embodiment. FIG. 3B depicts a suspension tail tip 210e with a corresponding electrical pad 210d, located at or on or near the suspension tail tip, electrically connected to an electrical pad 212d of the FPC 212 with solder 300 (or ACF).

Suspension Tail-Misalignment

Figure 3C:
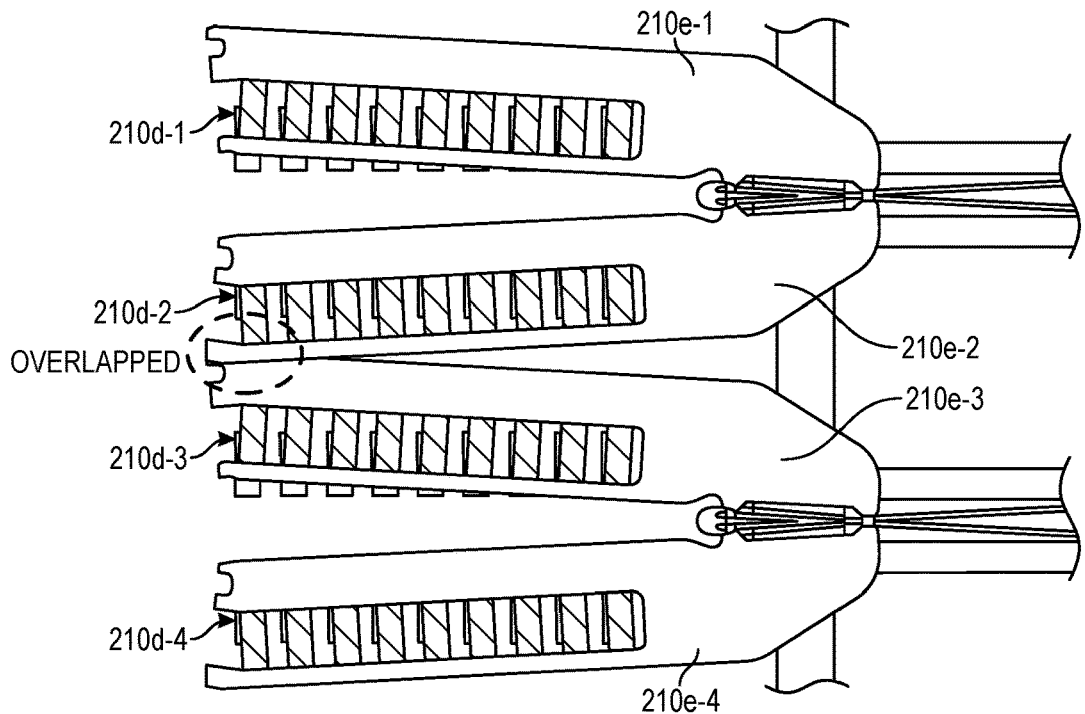
FIG. 3C is a front view illustrating adjacent suspension tail pairs in a misaligned configuration, according to an embodiment.
Figure 3D:
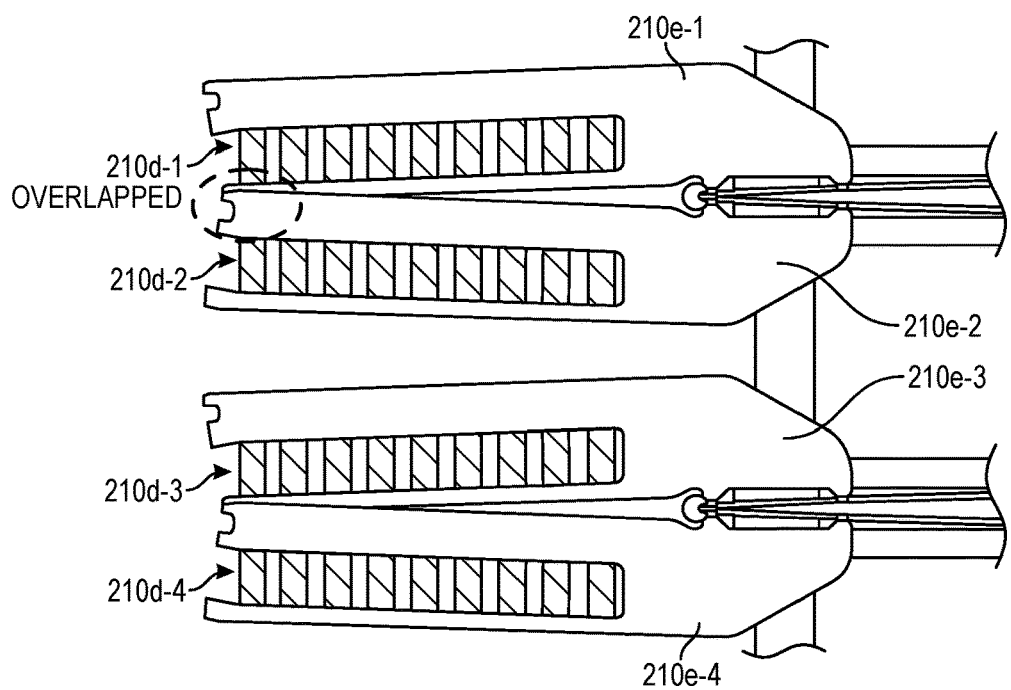
FIG. 3D is a front view illustrating adjacent suspension tail pairs in a misaligned configuration, according to an embodiment.

FIG. 3C is a front view illustrating adjacent suspension tail pairs in a misaligned configuration, according to an embodiment. FIG. 3C again depicts the two pairs of suspension tail tips, 210e-1 & 210e-2 and 210e-3 & 210e-4, and their corresponding set of electrical pads 210d-1, 210d-2, 210d-3, 210d-4. Here, the space between suspension tails is again relatively large, but with a large misalignment there is structural overlap depicted between the suspension tail tip 210e-2 of the first pair and the adjacent suspension tail tip 210e-3 of the second pair. FIG. 3D is a front view illustrating adjacent suspension tail pairs in a misaligned configuration, according to an embodiment. Similar in concept with FIG. 3C, FIG. 3D again depicts the two pairs of suspension tail tips, 210e-1 & 210e-2 and 210e-3 & 210e-4, and their corresponding set of electrical pads 210d-1, 210d-2, 210d-3, 210d-4. Here, the space between suspension tails is again relatively large, but with a large misalignment there is structural overlap depicted between the suspension tail tip 210e-1 and the adjacent suspension tail tip 210e-2 of the same pair, and similarly between the suspension tail tip 210e-3 and the adjacent suspension tail tip 210e-4 of the same pair. In either case, if an overlap occurs between adjacent suspension tails, then appropriate, suitable, effective electrical connections between such a suspension 210 and a corresponding FPC 212 is undesirably prevented or inhibited.

High-Capacity Suspension Tail-Nominal Alignment

In addition to an increase in the number of suspensions, the number of electrical pads is trending upward due to an increased number of functions, e.g., micro- and milli-actuating, assisted recording, and the like. Hence, there is also the possibility that the number of rows or lines of electrical pads may consequently increase. Such an increased number of pads and/or lines of pads leads to what is referred to herein as a "high-capacity" suspension.

Figure 4A:
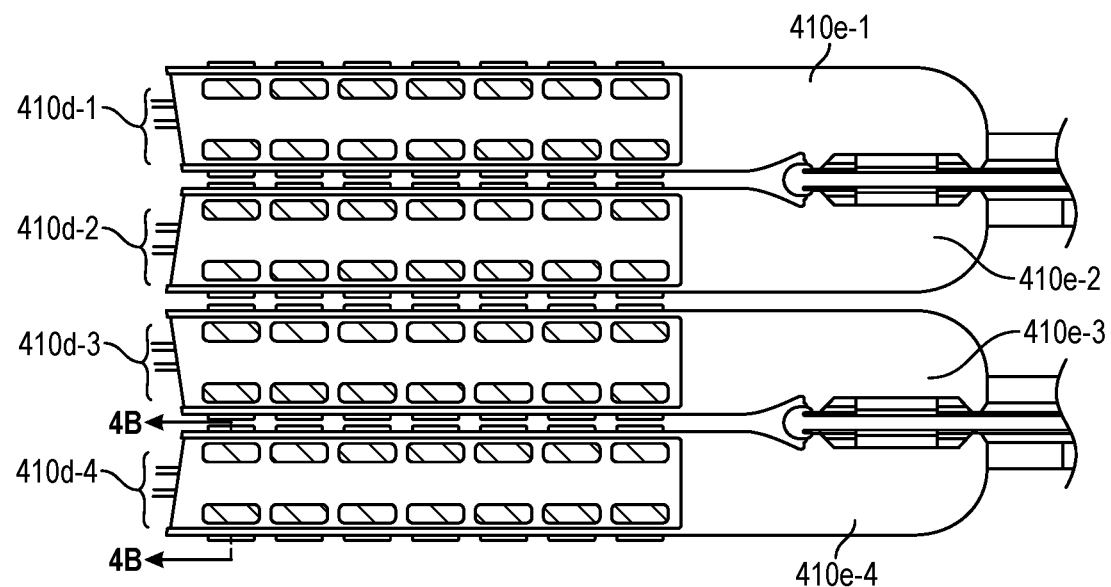
FIG. 4A is a front view illustrating adjacent high-capacity suspension tail pairs in a nominal configuration, according to an embodiment.
Figure 4B:
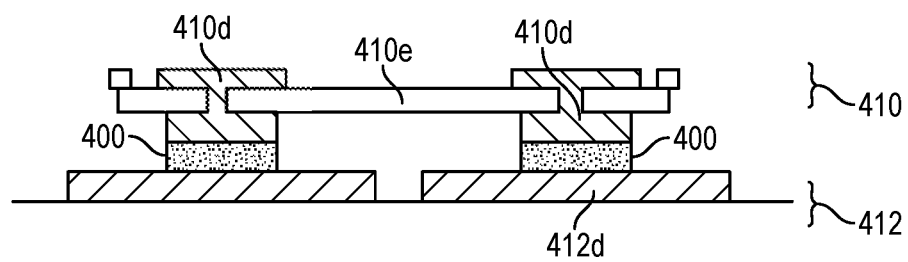
FIG. 4B is a cross-sectional view of a high-capacity suspension tail of FIG. 4A assembled with a flexible printed circuit (FPC), according to an embodiment.

FIG. 4A is a front view illustrating adjacent high-capacity suspension tail pairs in a nominal configuration, according to an embodiment. FIG. 4A depicts two pairs of suspension tails, 410e-1 & 410e-2 and 410e-3 & 410e-4, with each tail 410e-1 through 410e-4 having a corresponding set of electrical pads 410d-1, 410d-2, 410d-3, 410d-4, depicted here as pairs of lines of electrical pads. While the space between suspension tails is relatively smaller than before due to an increased number of pads, there is no overlap depicted. FIG. 4B is a cross-sectional view of a high-capacity suspension tail of FIG. 4A assembled with a flexible printed circuit (FPC), according to an embodiment. FIG. 4B depicts a suspension tail 410e with a pair of corresponding electrical pads 410d, located at or on or near the suspension tail tip, electrically connected to an electrical pad 412d of an FPC 412 with solder 400 (or ACF). According to an embodiment, each of the electrical pads 410d of the high-capacity suspension tail 410e is configured to extend through the suspension tail 410e material, as depicted in FIG. 4B for example.

High-Capacity Suspension Tail-Misalignment

Figure 4C:
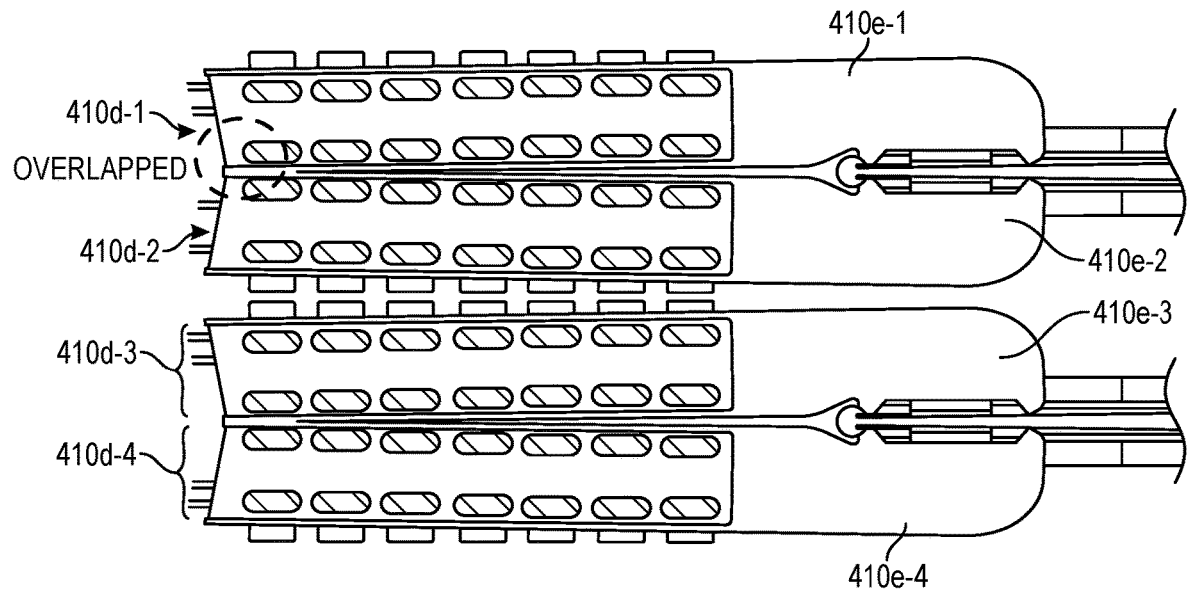
FIG. 4C is a front view illustrating adjacent high-capacity suspension tail pairs in a misaligned configuration, according to an embodiment.
Figure 4D:
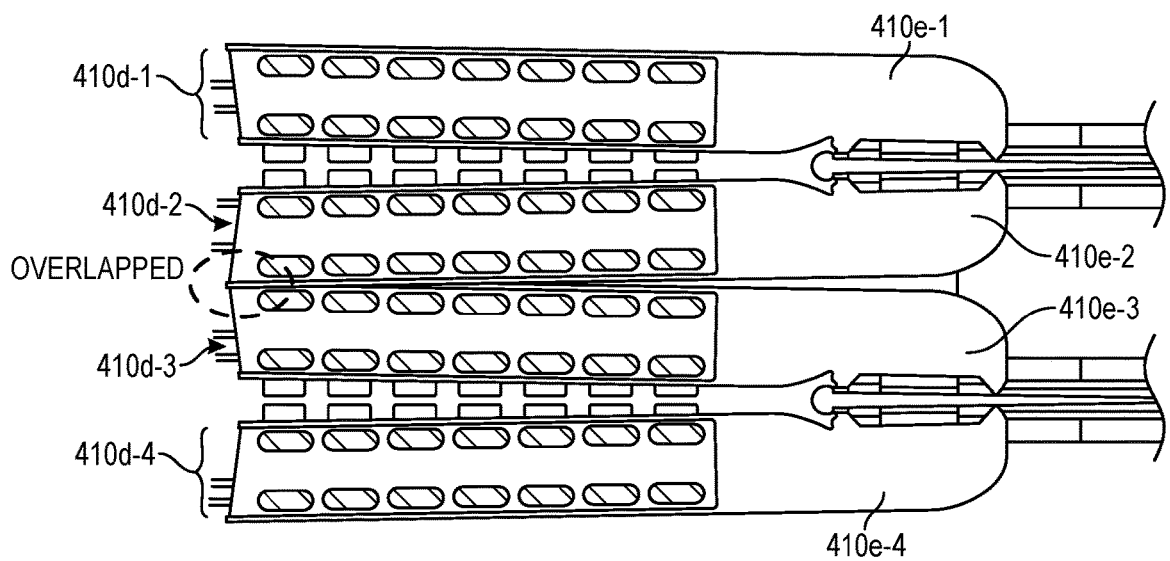
FIG. 4D is a front view illustrating adjacent high-capacity suspension tail pairs in a misaligned configuration, according to an embodiment.

FIG. 4C is a front view illustrating adjacent high-capacity suspension tail pairs in a misaligned configuration, according to an embodiment. FIG. 4C again depicts the two pairs of suspension tails, 410e-1 & 410e-2 and 410e-3 & 410e-4, and their corresponding set of electrical pads 410d-1, 410d-2, 410d-3, 410d-4. Here, as the space between suspension tails is again relatively small due to high-density high-capacity suspension tail, even with a minimal misalignment a structural overlap may occur, such as depicted between the suspension tail 410e-1 and the adjacent suspension tail 410e-2 of the same pair. FIG. 4D is a front view illustrating adjacent high-capacity suspension tail pairs in a misaligned configuration, according to an embodiment. Similar in concept with FIG. 4C, FIG. 4D again depicts the two pairs of suspension tails, 410e-1 & 410e-2 and 410e-3 & 410e-4, and their corresponding set of electrical pads 410d-1, 410d-2, 410d-3, 410d-4. Here, the space between suspension tails is again relatively small due to high-density high-capacity suspension tail, so even with a minimal misalignment a structural overlap may occur, such as depicted between the suspension tail 410e-2 of the first pair and the adjacent suspension tail 410e-3 of the second pair. In either case, if an overlap occurs between adjacent suspension tails, then appropriate, suitable, effective electrical connections between such a suspension and a corresponding FPC is undesirably prevented or inhibited.

Suspension Tail Having Narrowing Tip

As set forth herein, if suspensions or suspension tails are misaligned then suspension tail tips are easily overlapped. According to an embodiment, a suspension is constructed such that the suspension tail past the fold area is narrowed or tapered, thereby inhibiting or avoiding structural overlap even in misalignment scenarios.

FIG. 5A is a front view illustrating a high-capacity suspension tail having a narrowing tip, and FIG. 5B is a back view illustrating the high-capacity suspension tail having a narrowing tip of FIG. 5A, according to an embodiment. Suspension tail 500 comprises a tapered tip 502 comprising a plurality of electrical pads 504. That is, the tapered tip 502 is configured with a "decreasing taper" 502a, which narrows in the direction from the fold area (see FIG. 2B) of the suspension tail 500 toward the proximal end. The narrowing or decreasing taper 502a occurs generally in the plane of the suspension tail 500 that is parallel to and mates with a corresponding FPC (see, e.g., FPC 212 of FIG. 2A). As such, the dimension 2 is greater than the dimension 1 depicted in FIG. 5A. In the context of a suspension tail 500 having a tapered tip 502 with a decreasing taper 502a, structural overlap among adjacent suspensions/suspension tails in misalignment scenarios and, consequently, ineffective or marginalized electrical connections between the suspension tail 500 and a corresponding FPC, are inhibited, or lessened, or avoided.

According to an embodiment, the decreasing taper 502a is a stepped taper, as depicted in FIGS. 5A, 5B, which narrows down in steps rather than precisely linearly. However, a linear taper is also contemplated and falls within the scope of the disclosed embodiments of the invention. Furthermore, while two sets, grouping, rows, lines of electrical pads 504 are depicted in FIGS. 5A, 5B, a suspension tail having a single line (or greater than two lines) of electrical pads (e.g., electrical pads 504) coupled with a tapered tip (e.g., tapered tip 502) of decreasing taper (e.g., decreasing taper 502a) could be implemented and is therefore specifically contemplated.

Pad Aspect Ratio

Figure 6A:
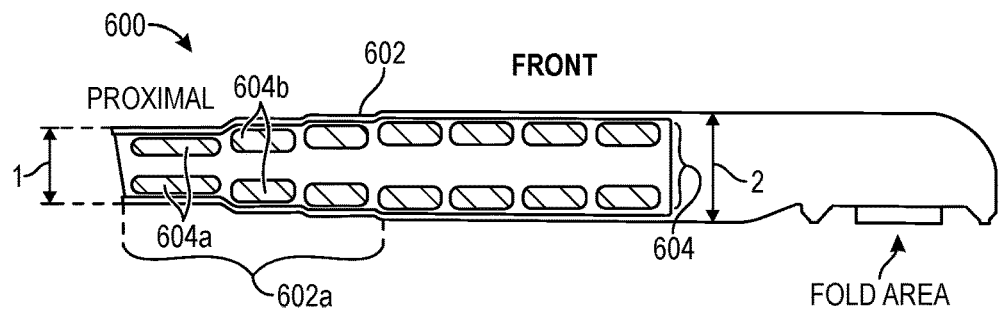
FIG. 6A is a front view illustrating a high-capacity suspension tail having a narrowing tip, according to an embodiment.
Figure 6B:
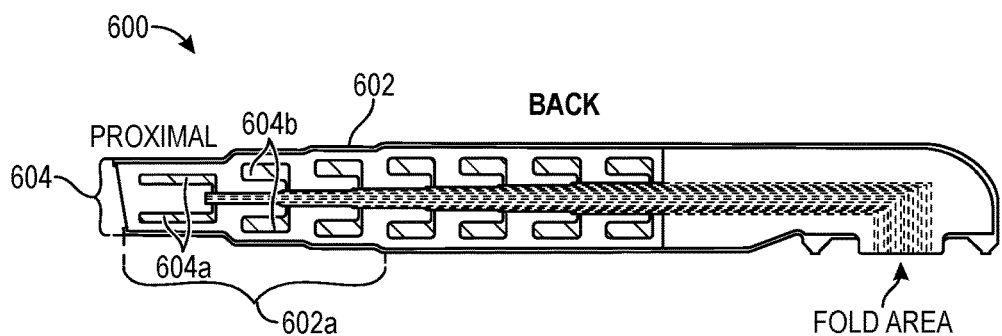
FIG. 6B is a back view illustrating the high-capacity suspension tail having a narrowing tip of FIG. 6A, according to an embodiment.

FIG. 6A is a front view illustrating a high-capacity suspension tail having a narrowing tip, and FIG. 6B is a back view illustrating the high-capacity suspension tail having a narrowing tip of FIG. 6A, according to an embodiment. Suspension tail 600 comprises a tapered tip 602 comprising a plurality of electrical pads 604. That is, the tapered tip 602 is configured with a "decreasing taper" 602a, which narrows in the direction from the fold area (see FIG. 2B) of the suspension tail 600 toward the proximal end. The narrowing or decreasing taper 602a occurs generally in the plane of the suspension tail 600 that is parallel to and mates with a corresponding FPC (see, e.g., FPC 212 of FIG. 2A). As such, the dimension 2 is greater than the dimension 1 depicted in FIG. 6A. In the context of a suspension tail 600 having a tapered tip 602 with a decreasing taper 602a, structural overlap among adjacent suspensions/suspension tails in misalignment scenarios and, consequently, ineffective or marginalized electrical connections between the suspension tail 600 and a corresponding FPC, are inhibited, or lessened, or avoided.

According to an embodiment, at least one electrical pad 604a of the multiple electrical pads 604 has a different aspect ratio than the aspect ratio of an adjacent electrical pad 604b. According to an embodiment and as generally depicted in FIGS. 6A, 6B, one or more electrical pads 604a at or near the proximal end of the tapered tip 602 is longer (e.g., in the direction toward the proximal end) and flatter/thinner (e.g., in the direction normal to the direction toward the proximal end) than the adjacent one or more electrical pads 604b (e.g., in the direction toward the distal end).

According to embodiments, at least the last one (or pair of) electrical pads 604a at the proximal end of the tapered tip 602 are the electrical pads having the different aspect ratio, thereby fitting within the narrowest portion of the tapered tip 602. While two sets, groupings, rows, or lines of electrical pads 604 are depicted in FIGS. 6A, 6B, a suspension tail having a single line (or greater than two lines) of electrical pads (e.g., electrical pads 604), at least one of which has a different aspect ratio, coupled with a tapered tip (e.g., tapered tip 602) of decreasing taper (e.g., decreasing taper 602a) could be implemented and is therefore specifically contemplated.

Number of Lines

Figure 7A:
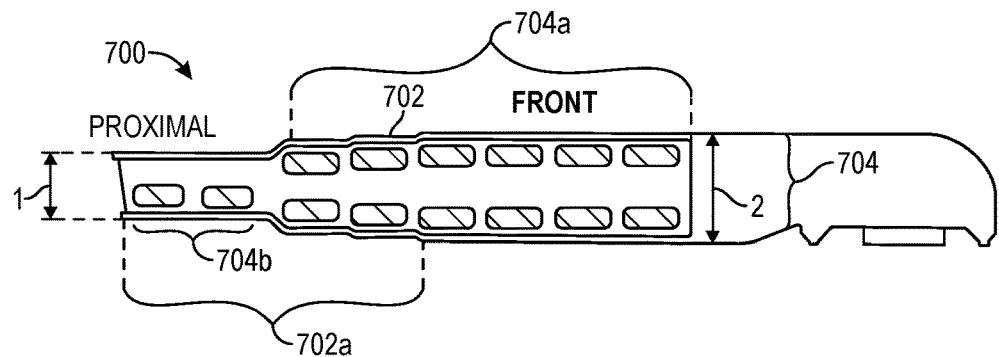
FIG. 7A is a front view illustrating a high-capacity suspension tail having a narrowing tip, according to an embodiment.
Figure 7B:
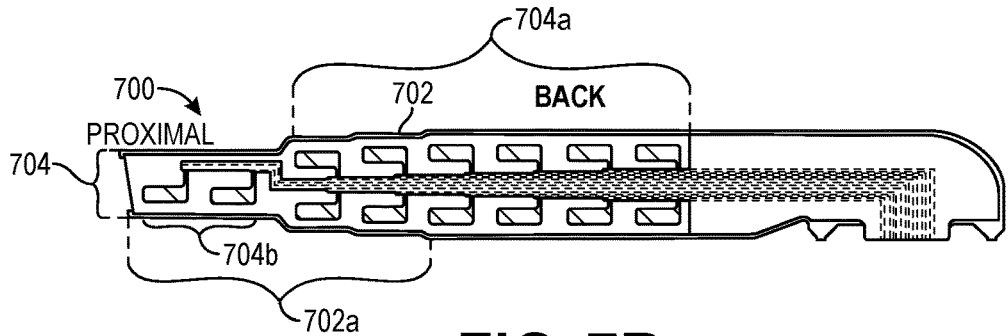
FIG. 7B is a back view illustrating the high-capacity suspension tail having a narrowing tip of FIG. 7A, according to an embodiment.

FIG. 7A is a front view illustrating a high-capacity suspension tail having a narrowing tip, and FIG. 7B is a back view illustrating the high-capacity suspension tail having a narrowing tip of FIG. 7A, according to an embodiment. Suspension tail 700 comprises a tapered tip 702 comprising a plurality of electrical pads 704. That is, the tapered tip 702 is configured with a "decreasing taper" 702a, which narrows in the direction from the fold area (see FIG. 2B) of the suspension tail 700 toward the proximal end. The narrowing or decreasing taper 702a occurs generally in the plane of the suspension tail 700 that is parallel to and mates with a corresponding FPC (see, e.g., FPC 212 of FIG. 2A). As such, the dimension 2 is greater than the dimension 1 depicted in FIG. 7A. In the context of a suspension tail 700 having a tapered tip 702 with a decreasing taper 702a, structural overlap among adjacent suspensions/suspension tails in misalignment scenarios and, consequently, ineffective or marginalized electrical connections between the suspension tail 700 and a corresponding FPC, are inhibited, or lessened, or avoided.

According to an embodiment, the number of lines (or sets, or groupings) of electrical pads 704 decreases at the tapered tip 702. For example, the electrical pads 704 along the suspension tail 700 go from two lines (i.e., pairs) to one line, as depicted in FIGS. 7A, 7B. That is, a first portion 704a of the electrical pads 704 is configured in pairs along a first portion of the suspension tail 700 and a second portion 704b of the electrical pads 704 is configured individually along a second portion of the of the suspension tail 700 that is nearer to the proximal end of the tapered tip 702 than the first portion of the suspension tail 700. According to an embodiment, at least the last one (most proximal) of the electrical pads 704 at the proximal end of the tapered tip 702 is configured in a single line rather than as part of a pair (e.g., as with the first portion 704a), thereby fitting within the narrowest portion of the tapered tip 702.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head stack assembly (HSA) comprising:
a plurality of read-write transducers each configured to read from and to write to at least one corresponding recording medium;
a flexible printed circuit (FPC); and
a plurality of suspensions each comprising a suspension tail electrically coupled to a respective read-write transducer of the plurality of read-write transducers and extending in a direction from the read-write transducer toward a tapered tip, of the suspension tail, formed by a series of multiple structural steps spanning a plurality of electrical pads coupled with the tapered tip.

2. The HSA of claim 1, wherein the tapered tip comprises a decreasing taper that narrows in the direction along at least a portion of a proximal side of a fold area of the suspension tail.

3. The HSA of claim 1, wherein each suspension further comprises the plurality of electrical pads coupled with the tapered tip and each electrically coupled to a corresponding electrical pad of the FPC.

4. A hard disk drive comprising the HSA of claim 3.

5. The HSA of claim 3, wherein:
the tapered tip comprises a decreasing taper that narrows, in the direction, along at least a portion of a proximal side of a fold area of the suspension tail; and
at least one electrical pad of the plurality of electrical pads of the suspension has a different aspect ratio than an aspect ratio of an adjacent, opposing the direction, electrical pad of the plurality of electrical pads of the suspension.

6. The HSA of claim 5, wherein the at least one electrical pad is longer, in the direction, than the adjacent electrical pad.

7. The HSA of claim 5, wherein the at least one electrical pad is thinner, in a direction normal to the direction, than the adjacent electrical pad.

8. The HSA of claim 3, wherein:
the tapered tip comprises a decreasing taper that narrows, in the direction, along at least a portion of a proximal side of a fold area of the suspension tail;

a first portion of the plurality of electrical pads of the suspension is configured in pairs along a first portion of the suspension; and a second portion of the plurality of electrical pads of the suspension is configured individually along a second portion of the suspension nearer an end of the tapered tip than the first portion of the suspension.

9. The HSA of claim 3, wherein:
the tapered tip comprises a decreasing taper that narrows, in the direction, along at least a portion of a proximal side of a fold area of the suspension tail; and each of a pair of electrical pads of the plurality of electrical pads of the suspension has a different aspect ratio than an aspect ratio of each of an adjacent, in the direction, pair of electrical pads of the plurality of electrical pads of the suspension.

10. A hard disk drive suspension comprising:
a suspension tail configured to electrically connect to a read-write transducer at a distal end and extending in a proximal direction toward a tapered tip at a proximal end, wherein the tapered tip comprises multiple structural steps forming a decreasing taper that narrows in the proximal direction and spanning a plurality of electrical pads coupled with the tapered tip.

11. The suspension of claim 10, wherein:
the tapered tip narrows along at least a portion of a proximal side of a fold area of the suspension tail; and
at least one electrical pad of the plurality of electrical pads of the suspension has a different aspect ratio than an aspect ratio of an adjacent electrical pad of the plurality of electrical pads of the suspension.

12. The suspension of claim 11, wherein the at least one electrical pad is longer, in the proximal direction, than the adjacent electrical pad.

13. The suspension of claim 11, wherein the at least one electrical pad is thinner, in a direction normal to the proximal direction, than the adjacent electrical pad.

14. The suspension of claim 10, wherein:
the tapered tip narrows along at least a portion of a proximal side of a fold area of the suspension tail;
a first portion of the plurality of electrical pads of the suspension is configured in pairs along a first portion of the suspension; and
a second portion of the plurality of electrical pads of the suspension is configured individually along a second portion of the suspension nearer an end of the tapered tip than the first portion of the suspension.

15. The suspension of claim 10, wherein:
the tapered tip narrows along at least a portion of a proximal side of a fold area of the suspension tail; and
each of a pair of electrical pads of the plurality of electrical pads of the suspension has a different aspect ratio than an aspect ratio of each of an adjacent pair of electrical pads of the plurality of electrical pads of the suspension.

16. A hard disk drive comprising:
a plurality of storage media rotatably mounted on a spindle;
circuitry means for transmitting electrical signals; and
a head stack assembly coupled with an actuator configured to move the head stack assembly to access portions of the storage media, the head stack assembly comprising:
a plurality of head sliders each housing a respective read-write transducer configured to read from and to write to at least one corresponding storage medium of the storage media, a plurality of suspensions each comprising a suspension tail electrically coupled to a respective head slider of the plurality of head sliders and extending in a direction from the head slider toward a tapered tip of the suspension tail, wherein the tapered tip comprises a series of multiple structural steps forming a decreasing taper that narrows in the direction along at least a portion of a proximal side of a fold area of the suspension tail and spanning a plurality of electrical pads coupled with the tapered tip, and
the plurality of electrical pads each electrically coupled with a corresponding electrical pad of the circuitry means.

17. The hard disk drive of claim 16, wherein at least a portion of the plurality of electrical pads of the suspension are configured in multiple rows each positioned along the direction.

18. A head stack assembly (HSA) comprising:
a plurality of read-write transducers each configured to read from and to write to at least one corresponding recording medium;
a flexible printed circuit (FPC);
a plurality of suspensions each comprising:
a suspension tail electrically coupled to a respective read-write transducer of the plurality of read-write transducers and extending in a direction from the read-write transducer toward a tapered tip of the suspension tail, and
a plurality of electrical pads coupled with the tapered tip and each electrically coupled to a corresponding electrical pad of the FPC;
wherein for each suspension:
the tapered tip comprises a decreasing taper that narrows in the direction along at least a portion of a proximal side of a fold area of the suspension tail; and
at least one electrical pad of the plurality of electrical pads of the suspension has a different aspect ratio than an aspect ratio of an adjacent, in the direction, electrical pad of the plurality of electrical pads of the suspension.

19. The HSA of claim 18, wherein each of a pair of electrical pads of the plurality of electrical pads of the suspension has a different aspect ratio than an aspect ratio of each of an adjacent, in the direction, pair of electrical pads of the plurality of electrical pads of the suspension.

20. A head stack assembly (HSA) comprising:
a plurality of read-write transducers each configured to read from and to write to at least one corresponding recording medium;
a flexible printed circuit (FPC);
a plurality of suspensions each comprising:
a suspension tail electrically coupled to a respective read-write transducer of the plurality of read-write transducers and extending in a direction from the read-write transducer toward a tapered tip of the suspension tail, and
a plurality of electrical pads coupled with the tapered tip and each electrically coupled to a corresponding electrical pad of the FPC;
wherein for each suspension:
the tapered tip comprises a decreasing taper that narrows in the direction along at least a portion of a proximal side of a fold area of the suspension tail;
a first portion of the plurality of electrical pads of the suspension is configured in pairs along a first portion of the suspension; and a second portion of the plurality of electrical pads of the suspension is configured individually along a second portion of the suspension nearer an end of the tapered tip than the first portion of the suspension.

21. A hard disk drive suspension comprising:

a suspension tail configured to electrically connect to a read-write transducer at a distal end and extending in a proximal direction toward a tapered tip at a proximal end;

a plurality of electrical pads coupled with the tapered tip; wherein:

the tapered tip comprises a decreasing taper that narrows in the proximal direction along at least a portion of a proximal side of a fold area of the suspension tail; and at least one electrical pad of the plurality of electrical pads has a different aspect ratio than an aspect ratio of an adjacent electrical pad of the plurality of electrical pads.

22. The suspension of claim 21, wherein each of a pair of electrical pads of the plurality of electrical pads has a different aspect ratio than an aspect ratio of each of an adjacent pair of electrical pads of the plurality of electrical pads.

23. A hard disk drive suspension comprising:

a suspension tail configured to electrically connect to a read-write transducer at a distal end and extending in a proximal direction toward a tapered tip at a proximal end;

a plurality of electrical pads coupled with the tapered tip; wherein:

the tapered tip comprises a decreasing taper that narrows in the proximal direction along at least a portion of a proximal side of a fold area of the suspension tail;

a first portion of the plurality of electrical pads is configured in pairs along a first portion of the suspension; and a second portion of the plurality of electrical pads is configured individually along a second portion of the suspension nearer an end of the tapered tip than the first portion of the suspension.

\* \* \* \* \*